UNITED STATES PATENT OFFICE.

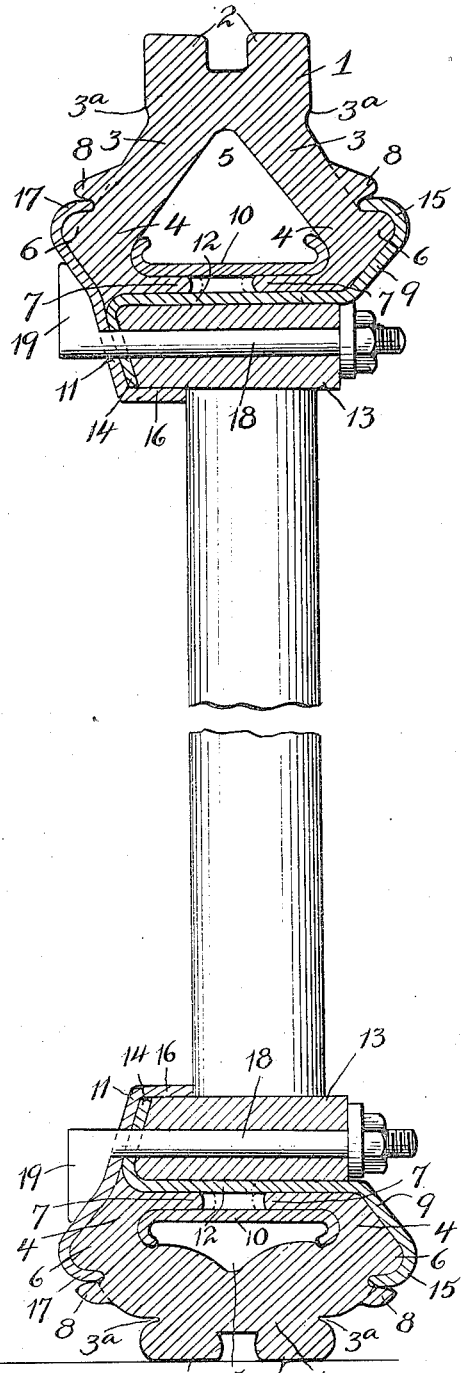

EDWARD BRICE KILLEN, OF LONDON, ENGLAND.

RUBBER TIRE AND ITS ATTACHMENT TO WHEELS.

1,209,715.  Specification of Letters Patent.  Patented Dec. 26, 1916.

Application filed January 6, 1912. Serial No. 669,754.

*To all whom it may concern:*

Be it known that I, EDWARD BRICE KILLEN, a subject of the King of Great Britain and Ireland, and residing at 52 Queen Victoria street, London, England, have invented certain new and useful Improvements in or Relating to Rubber Tires and Their Attachment to Wheels, of which the following is a specification.

This invention relates to hollow rubber tires of roughly triangular shape in cross section and having a tread which remains of substantially constant width with increase of load, in which the load is carried by the rubber itself without the use of confined air at high pressures, such as in the ordinary pneumatic tire of today.

An object of the present invention is to provide an air cushion tire which besides possessing longer life has more resilience and give for absorbing road shocks better than existing tires.

An aim of the invention is the production of a tire in which the rubber is not unduly stretched and in which wall cracking or disintegration does not take place under road wear and tear.

Another object of the invention is the provision of an efficient non-skid tread.

Further advantages achieved by the invention will be hereinafter described.

According to the invention the air chamber of the tire is made air tight, confining air at normal pressure or at a pressure which will not interfere with the action of the tire in the manner hereinafter described. The air chamber is made airtight by airtight joints formed by jamming or wedging extended toes, with which the beads of the tire are provided, between an endless retaining rim and the outer circumference of the wheel. The tire is of such a shape and proportion that the load forces act down the walls and internally cause the walls to bend or hinge inwardly, or, in other words, the walls thicken and bulge into the air chamber so that the base angles of the walls are decreased.

Further features of the invention will hereinafter appear.

The employment of confined air at low pressure in conjunction with a tire of the cross section according to this invention, secures the necessary speed of recovery to normal of the tire after it has been depressed by load or road shocks, which cannot be obtained in a solid or rubber cushion tire. The peculiar bulging inward of the walls of the tire and great reduction in cross sectional area of the air chamber when the tire is under load, enables the confined air to take effect upon the whole area of wall to assist in quickly restoring the tire to its normal shape. Without the assistance of confined air the tire would not recover to normal sufficiently quickly to receive the next depression or shock under ordinary work and consequently the tire would rapidly disintegrate.

In the accompanying drawings, the figure is a cross section of part of a wheel carrying a tire according to the invention, the lower half of the figure showing the tire depression in ground contact.

In carrying out the invention according to one mode, my tire is manufactured of rubber without fabric, homogeneous and without porosity. The tread 1 is provided with a flat treading circumference and so that it does not substantially increase in width in ground contact with increase of load. This type of tread may be hereinafter referred to as an "upstanding tread." The treading circumference is formed narrow as compared with the base of the tire, giving great lateral stability under all conditions, and may be provided with a plurality of circumferential ribs 2 (see Fig. 1) or the tread may be molded of any other suitable form to prevent skidding or slipping.

The tire is provided with side walls 3 which join the tread 1 to base beads 4. The walls 3 of the tire inclose between them the air chamber 5 of the tire. The walls are so arranged that the internal shape of the air chamber 5 in cross section is gable-like or triangular. The part $3^a$ at which the upstanding tread 1 joins the walls 3 of the tire (see Fig. 1) may be referred to as the neck.

Each bead 4 of the tire is molded with an annular rib 6 adapted to be engaged by a hooking flange and with an inwardly extending annular rubber flange 7. The annular rubber ribs 6 and the rubber flange 7 may be herein referred to as "hooking heels" and "extended toes" as these parts present somewhat the appearance of a heel and a toe when the tire is viewed in cross section.

Upon the outer surface of the walls 3 and above or outside the heels 6, annular flanges or beads 8 are molded. These beads 8 strengthen the walls at the part at which they are applied while at the same time they protect the metal flanges of the wheel from damage against a curb or stone. They also cause the rubber of the tire to flow inward instead of outward at all times under load or shocks thereby assisting in preventing outward bulging of the walls.

The sectional height of a tire for, say, a 23 to 30 cwt. vehicle from the treading circumference to the inner circumference of the base may be about 3 to 4 inches. The width of the base from the outer side of one heel to the outer side of the other, when the retaining rim (to be described) is fitted inside the tire, may be say 4½ to 5 inches. The width of the treading circumference may be, for instance, 2 to 3 inches with a depth between the apex of the air chamber and the outer surface or treading circumference of the tread, of about 1¼ inches. It is preferred to form the tire so that the width at the neck is substantially the same or slightly less than the width of the base or widest part of the air chamber when the retaining rim is in position so that there is no substantial vertical zone of rubber through which the load forces could be transmitted directly to the bed of the wheel. The existence of a zone such as this would tend to prevent the inward bending of the walls.

The means of airtight attachment for the tire may comprise a flanged bonding rim 9, a detachable side flange 11, a retaining rim 10 (each being constructed of steel), and attachment bolts. The flanged bonding rim 9 consists of a bed portion 12 fixed to the outer circumference of the felly 13, a flanged portion 14, extending inward as shown and a hooked flange 15 for hooking the heels 6 of the tire. The detachable side flange 11 is formed with an inwardly extending flange 16 for the purpose of guiding the side flange into position when attaching. This portion 16 also serves to key the side flange to the felly, when in position, thus relieving strain from the attachment bolts. The side flange has a hooked part or flange 17 for engaging the left hand hooking heel 6 and a bed portion, intermediate the hook 17 and the inward flange 16 adapted to lie against the flange 14 when the attachment device is clamped up.

The retaining rim 10 is made endless and indistortable, the edges thereof being curved or rounded. This rim is floated within the air chamber 5 upon the extended toes 7, being fitted into the tire before the latter is placed upon the wheel. When the retaining or floating rim 10 is in position the air chamber 5 is closed, so that a complete tube of gable-like or triangular cross section is formed. This tube is sealed as will hereinafter appear when the tire is secured upon the wheel and of course for this purpose the retaining rim 7 must be formed absolutely airtight.

The attachment bolts 18, preferably twelve in number, may be provided with feet 19 for engaging the outer side of the detachable flanges 11. The other ends of the bolts are provided with nuts and washers. The bolts pass through the felly and through orifices provided for the purpose in the flanges 14 and 11.

The tire is attached and the continuous air chamber made airtight in the following manner: The retaining rim 10 is fitted inside the tire so that it lies upon the toes 7 as shown in the drawing. The tube tire thus formed is pushed over the bed 12 of the wheel rim 9 so that the heel 6 is hooked under the flange 15. The toes 7 are keyed beneath the retaining rim (which floats upon the rubber) and the bed 12 of the wheel rim. The detachable side flange 11 is then fitted to the left base bead 4 being guided into position by its inwardly extending flange 16. The portion 17 of the detachable flange 11 hooks the heel 6. The attachment bolts are now passed through the felly and their nuts screwed up. This action clamps and locks the two beads under uniform compression over their whole circumferential area of the wheel, jamming or wedging the toes 7 between the retaining rim 10 and the bed 12 of the wheel rim 9. The jamming of the toes squeezes the rubber thereof and forms a uniform airtight joint all around the wheel between the inner and outer circumferences of the toes and the retaining rim and the bed 12 of the wheel rim 9. It will be understood that as the retaining rim 10 is floated, it can move and adjust itself to any inequalities of the rubber so that the airtight joints are formed under uniform compression, preventing the toes being subjected to greater compression at one place than another. The rigid clamping of the beads under compression between the hooking flanges forms a suitable support upon which the hinging or bending of the walls can take place, and at the same time, locks the beads in position so that any tendency of the tire to creep is entirely prevented.

When the tire comes into ground contact, the load forces acting through the upstanding tread are directed down the walls and inwardly toward the middle of the air chamber, (see lower portion of the drawing). The forces acting down the walls tend to compress them while the forces acting internally bend or cause the walls to hinge inwardly about their base beads. As the load or shock increases, so the walls continue to bulge inwardly while the rubber in the walls is put under further compression by the reactive effect of the inward bending. The great give which the tire possesses owing to this bending action enables a very long circumferential ground contact to be obtained with increase of wall to carry the load so that the load is efficiently distributed over the whole wall area of the part of the tire in ground contact as already described in the fore front of the specification. It is pointed out that when under load, the outer surface of the tread is put in compression owing to the inward bending of the tire. This prevents the tread from being cut or easily worn in running. The narrow compressed tread with its long circumferential ground contact and sharp cutting edges form a very effective non-skid tire.

Having now described my invention, what I claim as new and desire to secure by Letters Patent is:—

1. A rubber tire having an annular air chamber of gable-like cross section which is not inflated and has a base constituted by a floating endless metal rim which is in itself airtight, and means for making said air chamber airtight, said means comprising hookable base beads having extended rubber toes on which toes the endless metal rim is airtightly floated and an endless metal bonding rim formed with two hooking flanges and separated from the floating endless metal rim by an annular narrow space, the extended toes lying jammed in said annular narrow space between the floating endless metal rim and the endless metal bonding rim and forming airtight joints with the floating rim and the bonding rim on the outer and inner circumferences of the toes, as set forth.

2. A rubber tire having an annular air chamber of gable-like cross section which is not inflated and has a base constituted by a floating endless metal rim which is in itself airtight, means for making said air chamber airtight, said means comprising base-beads with hooking heels and extended rubber toes on which toes the endless metal rim is airtightly floated and an endless bonding rim having hooking flanges and separated from the floating endless metal rim by an annular narrow space, the extended toes lying jammed in said annular narrow space between the floating endless rim and the endless bonding rim and forming airtight joints with the floating rim and also with the bonding rim and annular strengthening beads (8) provided on the tire outside the hooking heels in the proximity of the hooking flanges of the bonding rim, for the purpose of enabling the fabricless rubber walls to flow inward instead of outward under load, as set forth.

In testimony whereof I have signed my name to this specification in the presence of two subscribing witnesses.

EDWARD BRICE KILLEN.

Witnesses:
 BERTRAM HARRY MATTHEWS,
 HERBERT D. JAMESON.